United States Patent [19]

Mickelson

[11] Patent Number: 4,574,245
[45] Date of Patent: Mar. 4, 1986

[54] MULTISENSOR DEMODULATOR AND A/D CONVERTER

[75] Inventor: Wilmer A. Mickelson, Cedar Rapids, Iowa

[73] Assignee: Rockwell International Corporation, El Segundo, Calif.

[21] Appl. No.: 432,874

[22] Filed: Oct. 5, 1982

[51] Int. Cl.$^4$ .......................... H03D 3/00; G01P 9/02
[52] U.S. Cl. .................................. 329/110; 329/122; 329/50; 73/504
[58] Field of Search ................ 73/504, 517 R, 517 A, 73/518; 307/514, 515, 516, 519; 329/50, 107, 110, 122, 126; 332/1; 375/80, 94

[56] References Cited
U.S. PATENT DOCUMENTS
4,222,270  9/1980  Allen ..................................... 73/504

Primary Examiner—Eugene R. LaRoche
Assistant Examiner—W. R. Paxman
Attorney, Agent, or Firm—George A. Montanye; H. Fredrick Hamann

[57] ABSTRACT

An apparatus and technique is disclosed for demodulating an FM signal provided as an output from a sensor assembly. The FM signal may represent acceleration as measured by a sensor included on a rotating wheel in an attitude and heading reference system. The FM signal is demodulated and directly converted to a digital value to provide digital signal processing with improved performance characteristics. The demodulation is accomplished by detecting each FM cycle to provide a signal output at the occurrence of each cycle. A reference mark on the rotating wheel is detected for providing synchronization such that a demodulation angle of the rotating wheel can be determined. The demodulation angle is represented as a sine value which is read for each FM cycle during one sensor revolution and summed with all previous sine values detected during that one revolution. A digital output of that sum is then provided as a measurement of acceleration or other parameter along an axis of the system.

18 Claims, 6 Drawing Figures

MULTISENSOR DEMODULATOR AND A/D CONVERTER

BACKGROUND OF THE INVENTION

The present invention relates to a system and technique for converting a signal to a digital value and more particularly to directly converting a frequency modulated sinusoidal signal to a digital output.

In modern navigation systems, rate and acceleration sensors are employed in attitude and heading reference systems. Such navigation systems, as are used in aircraft, missiles and other space vehicles, have advanced significantly with the advent of precision instruments and sophisticated computer technology. Such systems attempt to provide increased performance and reliability at a reasonable cost so that they may be economically incorporated in aircraft to provide the improved navigation benefits.

In one type of a conventional navigation system known as a strapped-down system, inertial devices are rigidly affixed and oriented with respect to a predetermined axis of a vehicle. A rotating rate and acceleration sensor may then be used to provide signal outputs which represent rate and acceleration measurements in multiple axes of the vehicle for providing information utilized in the navigation and control of the vehicle. In the past, such strapped-down systems have been costly because of the need for highly accurate mechanical assemblies and sensors and their accuracy has been limited by the signal processing capabilities used to demodulate the signals representing rate and acceleration. Although improved and less costly sensors have been developed, there are still many problems caused by unwanted harmonics, noise, phase shift and misalignment errors which prevent the accurate measurement of desired parameters.

In one example of a prior known navigation system employing a strapped-down technique, as disclosed in U.S. Pat. No. 4,444.053 entitled "Sensor Assembly for Strapped-Down Attitude and Heading Reference System" by B. F. Rider, filed Apr. 21, 1982 and assigned to the same assignee as this application, a rotating rate and acceleration sensor is disclosed which provides rate and acceleration measurement in multiple axes. Although the aforementioned system provides improved accuracy through the use of low-cost piezoelectric sensors, the nominally sinusoidal signals representing rate and acceleration must be coupled from the rotating sensor to external circuits capable of demodulating the signals to provide the rate and acceleration measurements. As disclosed in that application, the signals representing rate and acceleration are first converted from a voltage to a modulated frequency and then coupled by means of rotary transformers to external circuitry including frequency-to-voltage converters, sine/cosine demodulators and thereafter analog-to-digital converters for providing digital outputs for interfacing with appropriate digital control circuitry. While the system provides improved accuracy at less cost, the demodulation of the signal from the rotating sensor still produces inaccuracies and errors which have not been completely resolved. There is therefore a continuing need for signal demodulation systems which are capable of converting measured signals in navigation and other similar systems to digital values with improved accuracy.

The present invention has therefore been developed to overcome the shortcomings of the above known and similar techniques and to provide a signal processing system which generates a digital value directly from the frequency modulated signal produced by a sensor element.

SUMMARY OF THE INVENTION

In accordance with the present invention, a signal processing system is disclosed which receives a frequency modulated sinusoidal signal representing a measured parameter which, in an exemplary embodiment, may be rate or acceleration measured by a rotating multisensor. The system includes a circuit for detecting each FM cycle to provide a signal output at the occurrence of each cycle. The system also includes a circuit for synchronizing the system with a reference mark on the rotating sensor so that a demodulation angle can be measured with respect to a particular rotating sensor position. A value for the demodulation angle is read and summed with all previous sine values of the demodulation angle which occur for each FM cycle during one sensor revolution. When the sine values representing the digital demodulation angles have been summed over a period of one revolution, the digital output is a representation of the measured rate or acceleration along an axis of the vehicle in which the sensor is located. In performing the summation process, the demodulation angle is calculated for each of two components representing two axes of rate or acceleration and the digital outputs then represent acceleration or rate in each of two individual axes. A table representing values for the sine of the demodulation angle for multiple positions in a range of zero to 360° may be used to calculate the component values by multiplexing the table and shifting the demodulation angle for an orthogonal axis by 90° with respect to a first axis.

It is therefore a feature of the invention to provide a system and technique for providing digital demodulation of a sensed signal.

A further feature of the invention is to provide a system and technique for digitally demodulating an FM signal from a multisensor.

Yet another feature of the invention is to provide a signal processing technique which detects an FM signal and provides a digital output representing a fixed frame measurement.

Still another feature of the invention is to provide a signal processing system and technique which enables a simple and effective digital demodulation of the signal outputs provided by a rotating multisensor.

Yet a further feature of the invention is to provide a digital processing system which detects an FM signal during each revolution of a rotating sensor wheel to provide a digital output representing individual components of a measured parameter in each of two axes.

A still further feature of the invention is to provide a digital demodulation apparatus and technique which improves the accuracy of multisensor signal processing of rate and acceleration measurement.

Still another feature of the invention is to provide a processing technique using a digital sine table for providing values used in a summation process for decoding components of measured parameters.

These and other advantages and novel features of the invention will become apparent from the following detailed description when considered with the accompanying drawings wherein:

DETAILED DESCRIPTION OF A PREFERRED EMBODIMENT

Referring now to the drawings, wherein like numerals refer to like elements throughout, the present invention will be described with reference to its use as a signal demodulator in connection with the signals received from a rotating multisensor as described in the aforementioned U.S. Pat. No. 4,444,053. It will be understood, however, that the present inventive system and technique may be used to process and demodulate signals from other apparatus and systems which provide similar frequency modulated sinusoidal signal outputs or which provide signals capable of being converted to a frequency modulated signal output for processing by the inventive system. In describing the present invention, reference will be made to the aforementioned U.S. Pat. No. 4,444,053 as well as to U.S. Pat. No. 4,443,729 entitled "Piezoelectric Sensor" by B. F. Rider, filed June 22, 1981 and assigned to the same assignee as this application, both of which are hereby incorporated by reference in their entirety.

In the referenced multisensor, a voltage-to-frequency (V/F) converter is used to generate FM signals which represent a measure of rate or acceleration in each of two axes relative to the sensor wheel. Each of the signals (measurements) are sinusoidal over a period of one revolution of the rotating multisensor assembly where the amplitude of the sinusoidal signal is a measure of the magnitude of rate or acceleration and the phase of the sinusoidal signal is a measure of the two axis components (for example, vertical or horizontal). In the referenced U.S. Pat. No. 4,444,053, two piezoelectric sensor elements are employed for both rate and acceleration measurements to compensate for inaccuracies introduced by mechanical and electrical ambiguities during rotation and alignment of the sensors on the rotating sensor (wheel) assembly. The outputs from each of the two sensors are combined (as described in the referenced application) to produce a single sinusoidal output signal more accurately representing the components of rate and acceleration. The sinusoidal output signal, in the form of a varying voltage, is coupled to a voltage-to-frequency converter which produces a frequency modulated output signal representative of the phase and amplitude of the sinusoidal signal from the piezoelectric bender elements measuring rate and acceleration. The frequency modulated output signal is then coupled to a rotary transformer so that it may be provided to external circuitry for signal processing and demodulation to produce output signals representative of the components of rate and acceleration in multiple axes.

Demodulation of the frequency modulated signal as disclosed in the referenced co-pending application has been achieved by use of a frequency-to-voltage (F/V) converter, a sine/cosine demodulator, and an analog-to-digital converter which samples the demodulated analog signal to obtain the digital value of the fixed frame measurement of rate and acceleration. In accomplishing the demodulation and conversion with the above elements, expensive and complex elements are required to provide accurate digital outputs representative of the rate and acceleration. In addition, the size and weight of the elements comprising the demodulation system prevents their incorporation in new configurations which could improve the use and operation of the rotating assembly itself and encourage its use in additional vehicles and environments.

In accordance with the present invention, a frequency modulated signal is directly converted to a digital output with inexpensive and less complex elements using a technique which allows the alternative of incorporating much of the circuitry on the rotating multisensor assembly. In describing the inventive system and technique, the structure and operation will be detailed with respect to the processing of an acceleration signal from a multisensor assembly as described in the referenced U.S. Pat. No. 4,444,053, it being apparent, however, that the system and technique are equally applicable to the processing of rate or other parameters measured by the same multisensor or by other signal sources.

Figure 1:
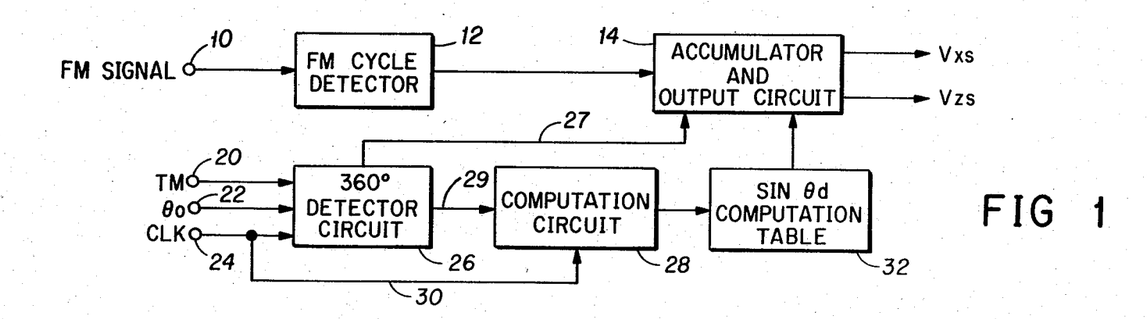
FIG. 1 is schematic block diagram illustrating one embodiment of the present invention.

Referring first to FIG. 1, a frequency modulated output signal as would normally be received from the acceleration sensor, is coupled to the input terminal 10. When used in connection with the referenced rotating multisensor, the terminal 10 is coupled to receive the output from one of the rotary transformers which provides the FM signal representing acceleration. The terminal 10 is coupled to an FM cycle detector 12 which generates a signal on the positive slope for each detected cycle of the frequency modulated signal transmitted from terminal 10. The output from cycle detector 12 is then provided as input to an accumulator and output circuit 14.

The accumulator circuit 14 produces a summation of digital values representing components of (in this instance) acceleration in each of two orthogonal directions, x and z, the component of acceleration in the x direction being represented as Vxs and the component of acceleration in the z direction being represented as Vzs. The multisensor assembly is mounted so that its spin axis lies along a third axis y which is orthogonal to the x and z axes. The values for Vxs and Vzs are a digital summation of individual digital values for $\cos \theta d$ and $\sin \theta d$ sampled at intervals determined by the output of the FM cycle detector 12 and summed over an interval equal to one 360° rotation of the multisensor wheel, as will be explained in more detail below. The outputs Vxs and Vzs are therefore digital values which represent the components of acceleration in each of the two orthogonal axes x and z.

The processing system further includes a signal TM coupled to terminal 20 which represents a tick mark reference located on the periphery of the multisensor assembly (wheel). The TM signal indicates a specific position of the wheel (and sensor) with respect to the reference axes of the vehicle in which the wheel assembly is located. A second signal, identified as $\theta o$, is also provided at another input terminal 22 wherein $\theta o$ is a set value which represents the initial angle of the wheel or position of the piezoelectric sensor element relative to the reference axes of the vehicle at the time of occurrence of the tick mark signal TM. A third signal CLK provides a clock at input 24 wherein the clock signal is used to drive the digital circuitry of the processing system and is synchronized with the tick mark signal TM to produce a predetermined number of cycles per revolution of the multisensor assembly.

Each of the three signals TM, $\theta o$ and CLK are provided as input to a 360° detector circuit 26. The 360° detector circuit 26 provides an output signal on line 27 (which is coupled to an input of the accumulator and output circuit 14) to reset the summed values Vx and Vz to zero upon the completion of a summation over each 360° interval or one rotation of the multisensor assembly and to provide an output of Vxs and Vzs for each 360° interval.

The output signal from the 360° detector is provided by line 29 to a computation circuit 28 which computes an angle $\theta d$ where $\theta d$ represents the demodulation angle and $\theta d = \theta o + Wst$ where Ws represents the spin speed of the multisensor assembly and t is normal time elapsed. The computation circuit 28 also receives a clock input CLK from 24 along line 30 and provides the demodulation angle $\theta d$ as an output coupled to sine $\theta d$ computation table 32. The sine computation table 32 produces a digital sine value for the particular angle of $\theta d$ and provides that value for summation in the accumulator circuit 14 each time the accumulator 14 receives a signal from cycle detector 12. Thus, the accumulator 14 provides a summation $Vx = Vx + \cos \theta d$ and $Vz = Vz + \sin \theta d$ (where $\sin \theta d$ and $\cos \theta d$ are obtained from computation circuit 32) each time an output signal from the detector 12 is received, and the summations Vx and Vz are updated each time a subsequent signal is received from FM cycle detector 12. After summation of Vx and Vz over one wheel revolution, a signal from 360° detector 26 causes the accumulator and output circuit 14 to provide the current value of Vx and Vz to be provided as output signals Vxs and Vzs and then to reset Vx and Vz to zero. The accumulator output for Vxs and Vzs is then $$Vxs = \sum_{i=1}^{N} \cos \theta di \text{ and } Vzs = \sum_{i=1}^{N} \sin \theta di \quad (1)$$

where N is the number of FM cycles occurring over the period of one 360° multisensor revolution and $\theta di$ represents the ith value of $\theta d$.

In order to understand the operation of the processing circuit in producing a digital output representing a component of acceleration in a given axis, the fixed frame voltage in one axis z may be defined in terms of the voltage V induced in the rotating assembly and provided as output from the piezoelectric crystal located thereon as:

$$FVz = \frac{2}{\Delta T} \int_0^{\Delta T} V \sin \theta d \, dt \quad (2)$$

where $\theta d$ is equal to the angle of the multisensor assembly and $\Delta T$ represents the period of one rotation of the sensor. The following analysis will be restricted to the z axis although it will be apparent that the same holds true for the x axis.

Referring again to the multisensor assembly, the output voltage V representing the acceleration is converted by a voltage to frequency converter to produce an FM signal which has an output frequency WFM where $$WFM = Wo + KV \quad (3)$$

where Wo is the nominal frequency provided by the voltage-to-frequency converter, K is a constant and V is the voltage induced in the rotating crystal by the forces resulting from the acceleration component. If a function Z is defined where $$Z = \int_0^{\Delta T} \frac{WFM}{2\pi} \sin \theta d \, dt \quad (4)$$

then $$Z = \int_0^{\Delta T} \frac{Wo}{2\pi} \sin \theta d \, dt + \int_0^{\Delta T} \frac{KV}{2\pi} \sin \theta d \, dt \quad (5)$$

If the integral is measured over a period $\Delta T$ which corresponds to the rotation of $\theta$ through $2\pi$ radians or one revolution of the multisensor assembly, then the first integral in equation 5 becomes equal to zero and $$Z = \frac{K}{2\pi} \int_0^{\Delta T} V \sin \theta d \, dt \quad (6)$$

If equations 2 and 6 are then combined, Z may then be defined as $$Z = \left(\frac{K}{2\pi}\right)\left(\frac{\Delta T}{2}\right) FVz \text{ or } Z = \left(\frac{K\Delta T}{4\pi}\right) FVz \quad (7)$$

Turning again to equation 4, the same can be approximated by a digital summation process. If WFM is approximately equal to 1100 Ws, where Ws is the multisensor (wheel) spin speed, the sine of $\theta d$ may be considered to approximately equal the sine of $\theta di$ over a small time period $\sigma t$ where $(WFM/2\pi)\sigma t = 1$ FM cycle. Using these assumptions, equation (4) may be represented as an approximation where $$Z \approx \sum_{i=1}^{N} \sin \theta di \left(\frac{WFM}{2\pi} \sigma ti\right) = \sum_{i=1}^{N} \sin \theta di \quad (8)$$

where N again is equal to the number FM cycles over the period $\Delta T$ of one rotation of the multisensor assembly. Looking at equations 1, 7, and 8, gives $$\left(\frac{K\Delta T}{4\pi}\right) FVz = Z \approx \sum_{i=1}^{N} \sin \theta di = Vzs \quad (9)$$

The fixed frame voltage FVz is then approximated by the equation $$FVz \approx \left(\frac{4\pi}{K\Delta T}\right) Vzs = \left(\frac{4\pi}{K\Delta T}\right) \sum_{i=1}^{N} \sin \theta di \quad (10)$$

Since the term $4\pi/K\Delta T$ is a constant which may be combined in the multisensor scaling, the fixed frame reference voltage $$FVz \simeq \sum_{i=1}^{N} \sin\theta di, \text{ or } FVz \simeq Vzs \qquad (11)$$

which is the term provided by the summation output of the accumulator 14.

Figure 2:
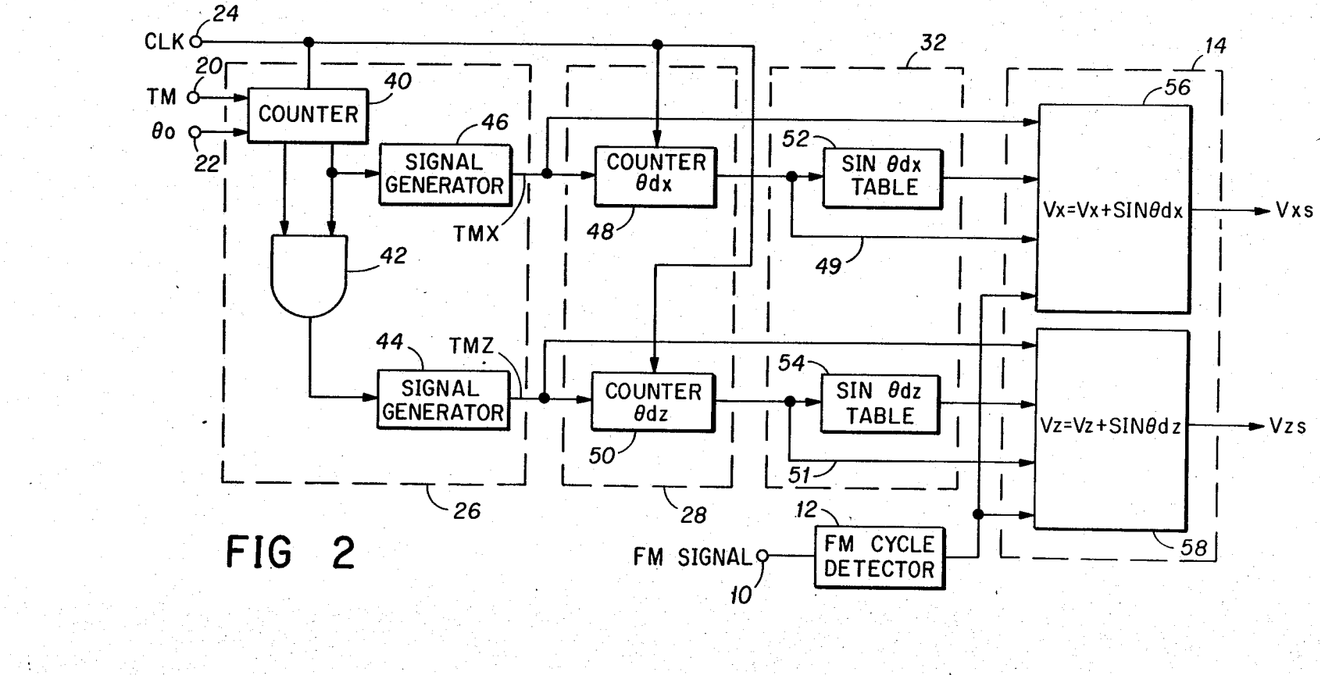
FIG. 2 is a schematic block diagram showing in more detail the implementation of the system of FIG. 1.

Referring now to FIG. 2, a more detailed functional diagram of the circuit of FIG. 1 is shown. As in FIG. 1, the output from accumulator 14 provides each of two digital values representative of the components of acceleration in each of two orthogonal axes. The first component represented by Vxs is the result of summing individual values Vx for the component as obtained from the sine table 32 at each signal output (interruption) provided by the FM cycle detector 12. Thus, the individual value Vx=Vx+cos θd is a summation over each rotation of the multisensor assembly until one revolution provides a total summation resulting in Vxs. In performing the summation, (Vx=Vx+cos θd) the cos θd may be measured using the same sine table 32 by shifting the measurement angle 90° with respect to the sin θd. The cos θd is represented as sin θdx when measurements are made in the x axis, and the demodulation angle associated with that summation is θdx.

Likewise, for computation of the component of acceleration in the z axis, the demodulation angle θdz (where sin θd=sin θdz) is measured and the summation Vz=Vz+sin θdz is made over one multisensor rotation to produce a new value for Vz for each FM cycle detector signal output. Again, the sin θd is taken from the sine table 32 and the measurement interval is snifted 90° with respect to the measurement for the component in the x axis. The output in the z axis is then Vzs which is a summation of sin θd over one complete revolution of the multisensor wheel.

In one specific example shown, the tick mark (TM) signal from the multisensor is provided once per wheel revolution at input 20 of detector circuit 26. At the same time, the input CLK from a clock (in the present example a 213 kHz pulse signal) is provided at terminal 24. The tick mark signal is synchronous with the 213 kHz clock signal and the wheel is rotated at a rate such that there are approximately 4096 clock cycles per wheel revolution. The number of clock cycles may be more or less than 4096 as a result of sensor motor hunting, but the resulting output signals will not be significantly affected by small variations. The tick mark signal is provided as input along with the clock signal to a counter 40 which has an input θo which initializes the count based on the position of the sensor on the wheel with respect to the tick mark. Thus, depending on the position of the sensor relative to the TM, the counter will be initialized to compensate so that a signal output occurs at the proper angle. The θo angle lies in a range between −180° and −90°. After receipt of the tick mark, the counter counts to the −90° angle and causes generation of a timing signal through AND gate 42 which represents the timing mark signal for the x axis and sets the θdx to zero. When the counter 40 counts to a point 90° away from that position the counter 40 reaches 0° setting θdz=0.

The timing signal (TMz) for the z axis occurs through generator 44 while the timing signal (TMx) for the x axis occurs through generator 46. When the x axis timing signal TMx is the pulse output from generator 46, the pulse TMx is provided to a counter 48 representing θdx and also as input to the accumulator 14. Likewise, when a pulse from 44 representing the timing signal TMz is provided as output, it is coupled to a counter 50 which represents the angle θdz and is also provided as input to the accumulator 14. A zero input is provided along with the clock pulse CLK to each of counters 48 and 50 so that upon receipt of the timing pulses TMx or TMz respectively, the counters 48 and 50 will be initially set to zero. Thereafter, the counters will provide a digital output (address) representing an angular position θdx and θdz of the x and z components of acceleration, each of which are separated by 90°.

The outputs from the counters 48 and 50 are used as addresses to select the appropriate sin θd and cos θd values from the sine table 32. The sin θd and cos θd values correspond to the sin θdz and sin θdx values selected from the same sine table 32 even though represented as components 52 and 54. In operation, the sine table 32 may be configured as a programmed read only memory (PROM) which is sequentially accessed or multiplexed to provide the values necessary to produce the sums Vx and Vz. The most significant bit from the counters 48 and 50 may be provided over lines 49 and 51 respectively and used in the accumulator 14 (as represented by components 56 and 58) to provide sign (+or−) information while the output from the sine table 32 may be an 8-bit number representing the particular angular position. The outputs for the sin θdx and sin θdz of table 32 are then provided in the accumulator 14 to provide the summations Vx=Vx+cos θd and Vz=Vz+sin θd wherein cos θd=sin θdx and sin θd=sin θdz. The accumulator 14 performs a summation of the resulting outputs Vx or Vz over one wheel revolution and the component of acceleration along the measured x or z axis is then equal to the summation developed by the previous equation 11 where $$FVz = \left(\frac{4\pi}{K\Delta T}\right) \sum_{i=1}^{N} \sin\theta di \text{ and}$$

$$FVx = \left(\frac{4\pi}{K\Delta T}\right) \sum_{i=1}^{N} \cos\theta di$$

Figure 3A:
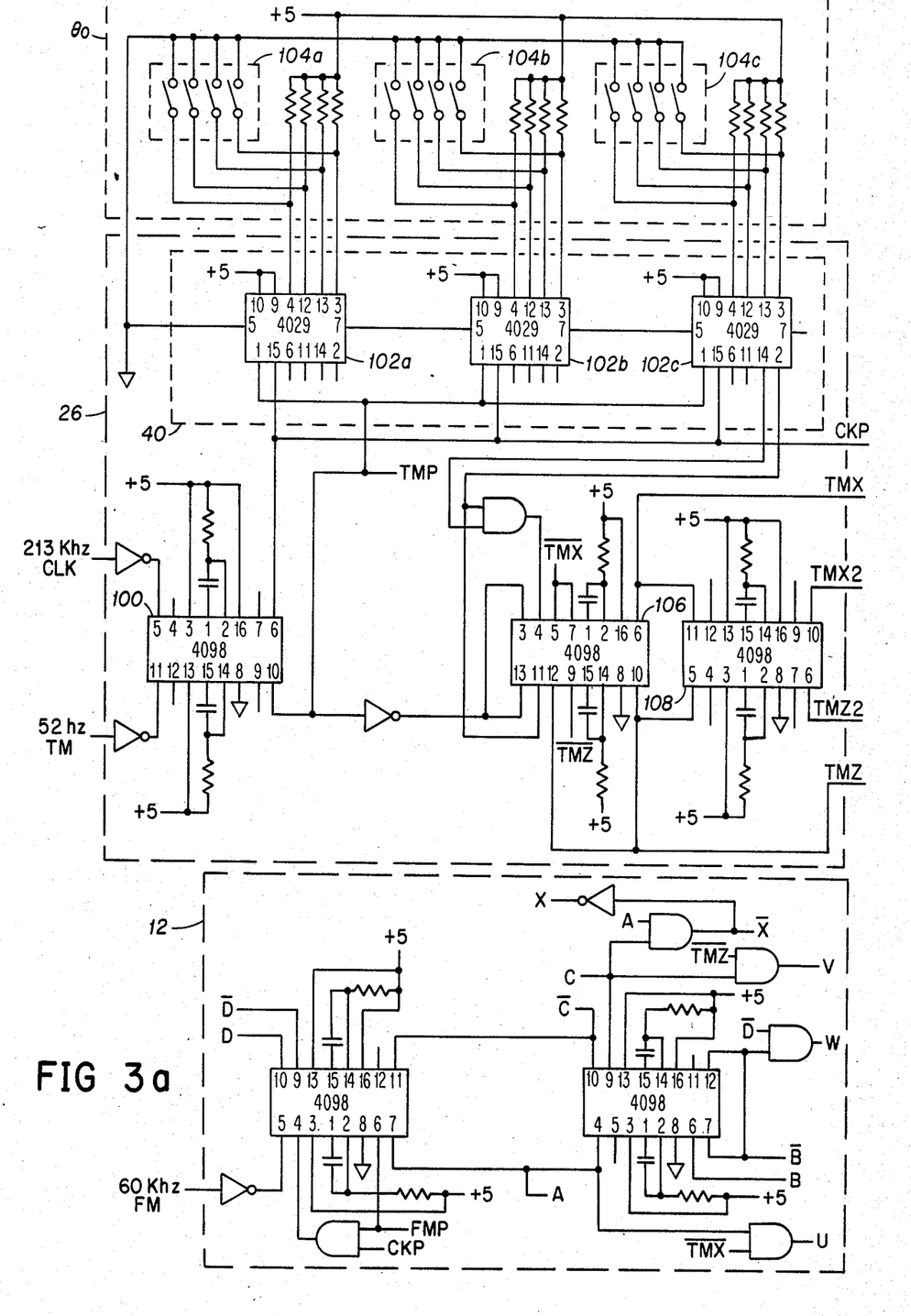
FIG. 3 is a detailed schematic diagram showing exemplary circuits which may be used in the embodiment of FIGS. 1 and 2.
Figure 3B:
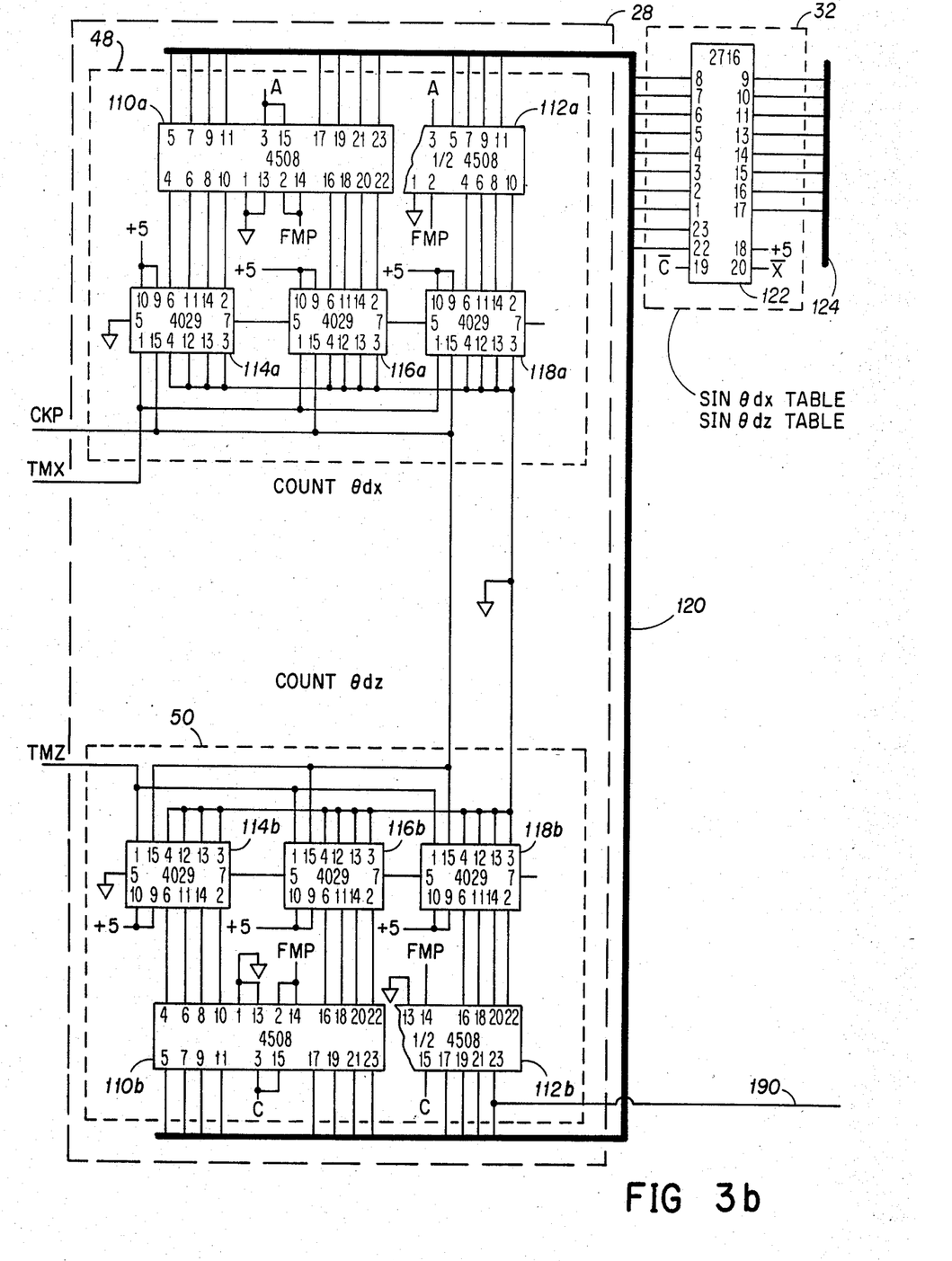
Figure 3C:
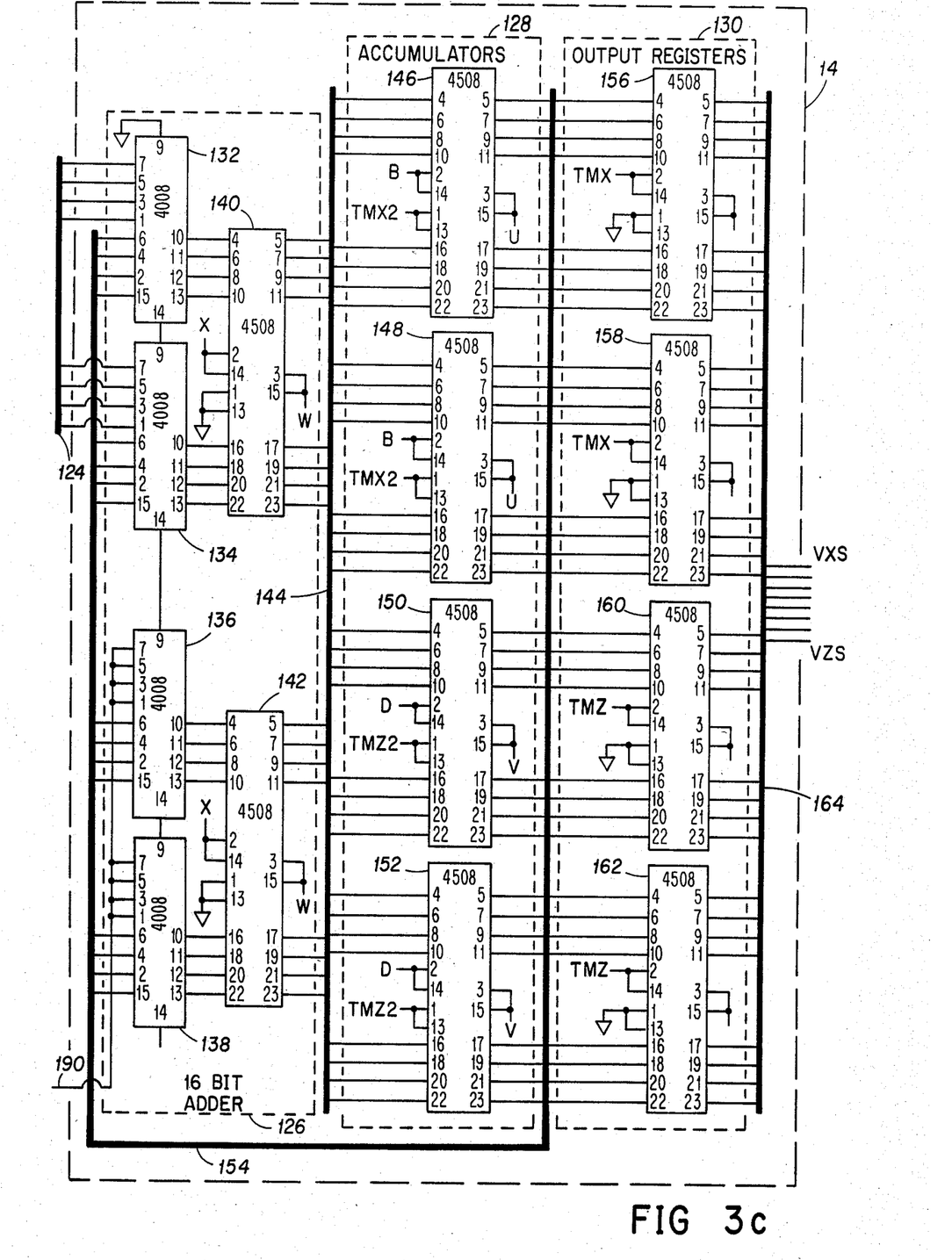
Figure 4:
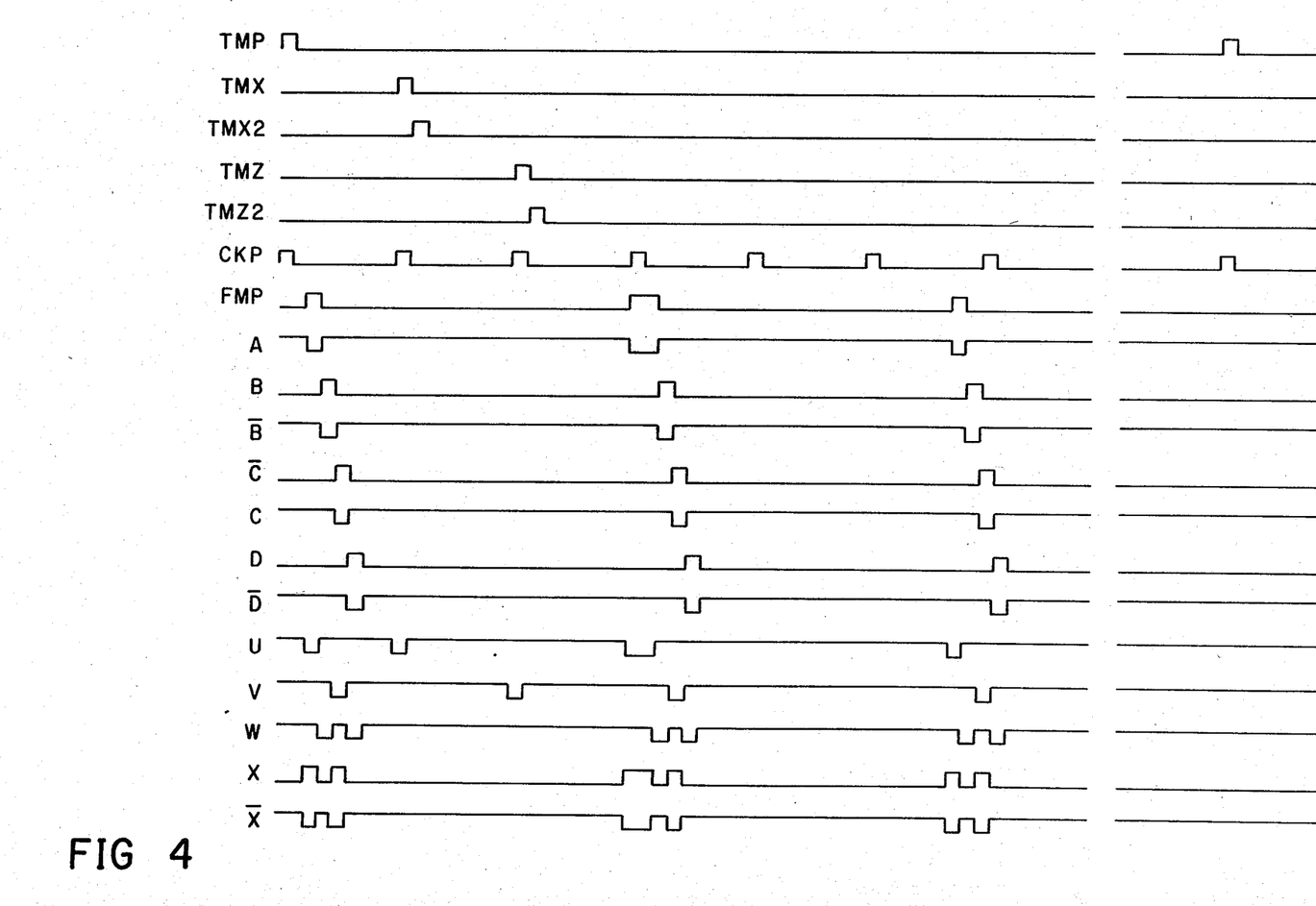
FIG. 4 is a diagram showing the timing pulses at different points in the detailed ciruitry of FIG. 3.

Turning now to FIG. 3 and FIG. 4, there is shown a more detailed diagram of exemplary circuits which may be used to perform the operation as described with respect to FIG. 2. Each of the circuits comprising the elements shown in FIG. 2 is particularly shown by element number and input numbers in the diagram of FIG. 3. Each of the elements produces a timing pulse which may be correlated with respect to FIG. 4 by reference to the identifying numerals. The timing waveforms of FIG. 4 are shown in timed relationship with respect to one another for the same time period. Each of the waveforms repeats for each successive time period. By way of example, detector circuit 26 receives a 213 kHz CLK signal at one input and a 52 Hz TM signal at another input, both of which are coupled to a 4098 integrated circuit (IC) 100. The θo signal is coupled to detector circuit 26 through three 4029 ICs, 102a, 102b, and 102c. Initialization of θo as previously described is made by a series of switches 104a, 104b, and 104c, which control the initial count in the counter 40. The output from IC 100 and outputs from ICs 102a, b and c are coupled to 4098 IC 106 to produce the timing signals TMx and TMz as shown in the drawing. The ICs 106 and 108 also produce timing signals TMX2 and TMZ2, which are coupled through the NOR gates in the manner shown in FIG. 3b to produce timing signal Y for coupling at the appropriate points in adder 126. Other timing signals (including those shown in FIG. 4) are generated as various outputs of the elements shown in the drawings of FIGS. 3a–3c, and are coupled to drive the elements in the manner indicated in those drawings. The FM cycle detector 12 receives an FM signal which, in the present instance, has a center frequency of 60 kHz in the absence of any modulating signal from the sensor assembly. The 60 kHz signal is received by the 4027 flip-flop to provide squarewave outputs for coupling in the manner shown in FIG. 3a.

The interconnection of the ICs in FIG. 3 includes timing RC circuits (generally shown coupled to pins 1, 2 and 14, 15 in the 4098 IC's). in which the resistors are 10 kohms and the capacitors are 100 pf and the gating interconnections use 4081 AND gates and 4049 inverters. The outputs from detector circuit 26 are coupled to the computation circuit 28 including counters 48 and 50, each counter generally including a 4508 IC 110a, one-half of a 4508 IC 112a, and three 4029 ICs 114a, 116a, and 118a. The counter 50 includes the same elements identified as 110b, 112b, 114b, 116b, and 118b. The output from computation circuit 28 is provided over a conventional electrical bus to sine $\theta$d table 32 which is a 2716 IC 122 structured to provide a 1024 word matrix of sine values. Due to the timing created by detector circuit 26, the sine table 32 is multiplexed alternately by counters 48 and 50 to provide the sin $\theta$dx and sin $\theta$dz as previously described.

The outputs from IC 122 are coupled via conventional bus 124 to the accumulator and output circuit 14. These inputs are coupled to 4008 ICs 132 and 134 which form part of a 16-bit adder circuit 126 additionally including 4008 ICs 136 and 138 and 4508 ICs 140 and 142. The outputs from 16-bit adder 126 as taken from ICs 140 and 142 are coupled via conventional bus 144 as input to accumulator circuit 128 formed by 4508 ICs 146, 148, 150 and 152. The outputs from accumulator 128 are coupled via conventional bus 154 as inputs to output registers 130 formed by 4508 ICs 156, 158, 160 and 162. The output from the accumulator 128 is also coupled via bus 154 as input to ICs 132, 134, 136, and 138 to perform the summations for Vx and Vz. The output from the output registers 130 is then coupled via conventional bus 164 to provide the Vxs and Vzs outputs from the accumulator and output circuit 14.

With the circuit shown in FIG. 3, the sine table 32 is multiplexed to provide values for cos $\theta$d and sin $\theta$d (sin $\theta$dx and sin $\theta$dz) sequentially to the adder 126 and accumulator 128 of output circuit 14, thereby allowing the same sine tables to be used for producing the summations required for each of the component axes x and z. The 16-bit adder 126 allows the summations to be made prior to entry in the accumulator 128 and the output registers 130 read and store the accumulator sums in 128 at the end of each multisensor revolution. The output registers 130 must thereafter be read (by an appropriate address decoding signal applied to registers 130 at pins 3 and 15) before entry of the next sum from the accumulators 128 so that the information for each successive revolution of the multisensor assembly will not be destroyed. While each of the elements are shown in detail, the configuration does not constitute the sole implementation of the functinal operation of the described system, it being apparent that other implementations may be employed to produce the same results. The particular configurations shown and the timing involved is an example of one circuit which will produce the desired timing and sine functions capable of being added to provide the direct digital demodulation of the voltage as represented by the frequency modulated signal provided at its input.

As may be seen, the above system and technique enables the direct conversion of a frequency modulated sinusoidal signal representing the magnitude of a measured parameter to be converted directly to a digital signal. The voltage-to-frequency conversion from a rotating multisensor wheel may be made using conventional circuitry and the present system may then be provided to demodulate that signal for providing the individual signal components in each of two axes. The circuitry necessary to produce the demodulation is simpler and allows the inclusion of most of the circuitry on the rotating multisensor assembly as well as in a separate signal processing unit. The circuitry uses common elements and deletes the requirement for precision A/D conversion and the required accuracy of cycle detection encountered in prior known systems. Because the sin $\theta$d begins and ends where the sin $\theta$=0, small errors caused by inaccurate measurements of the FM cycles at either end of the summation interval have a very small effect on the output value of the signal components, This reduces the requirement for highly accurate counting of the FM cycles in the demodulation process. All of these are advantages that are unrecognized in the prior art.

While the invention has been described with particular reference to the use of specific elements and values, the same may be altered without departing from the teachings of the invention. Thus, although it has been found that the use of the specified frequencies and timing relationships have been beneficial in the current example, other timing values may be employed. Likewise, the use of 16-bit accumulators along with the sine table of 1024 words is only exemplary of the types of devices that may be employed. Also, while the demodulation has been performed over one full cycle, it will be apparent that it could be performed over one-half cycle as well. Additionally, although the technique has been described with respect to two axis demodulation, it is apparent that the simpler single axis demodulation could be employed.

Obviously, many other modifications and variations of the present invention are possible in light of the above teachings. It is therefore to be understood that within the scope of the appended claims, the invention may be practiced otherwise than as specifically described.

What is claimed is:

1. A signal demodulation system comprising: means for receiving a modulated cyclic signal; means for detecting each cycle of said modulated signal; means for selecting a sine value in response to each detected cycle;
   means for cumulatively summing the sine values selected during a predetermined interval; and
   means for providing an output of said summation over said predetermined interval as a demodulated signal.

2. The system of claim 1 wherein said modulated cyclic signal is a frequency modulated signal which is modulated by a sinusoidal signal.

3. The system of claim 2 wherein said predetermined interval is one cycle of said sinusodial signal.

4. In a signal demodulation system for converting a sinusoidal voltage having a phase and amplitude representing a measured parameter, means for converting said sinusodial voltage to a digital output representative of said sinusodial voltage, the improvement in said means for converting comprising:

means for changing said sinusodial voltage to a frequency moduated signal representative of the phase and amplitude of said sinusodial voltage;

means for detecting each cycle of said frequency modulated signal;

means for providing a digital sine valve output in response to each detected cycle;

means for cumulatively summing the sine valve outputs in responsive to each detected frequency modulated cycle; and means for providing an output representing the summation of said sine value outputs over a predetermined interval as a demodulated signal representing said measured parameter.

5. The system of claim 4 wherein said means for summing performs a digital summation.

6. The system of claim 4 wherein said predetermined interval is one period of said sinusoidal voltage.

7. A system of digitally demodulating an FM signal of a rotating multisensor assembly comprising:

means for generating an FM signal modulated by a sinusoidal signal from a rotating multisensor assembly;

means for detecting each cycle of said FM signal;

means responsive to said means for detecting for providing a digital sine valve output in response to each detected FM cycle;

means responsive to each FM cycle for cumulatively summing successive sine value outputs; and means for providing an output representing the summation of said sine value outputs over an interval equal to one 360° rotation of said multisensor assembly as a demodulated output.

8. The system of claim 7 wherein said means for providing a sum comprises a digital summing circuit.

9. The system of claim 8 wherein said means for providing an output comprises means for providing a digital output representative of the summed sine value output.

10. The system of claim 7 wherein said means for providing a digital sine value output is a table of a predetermined number of sine values representing angles between 0° and 360°.

11. A rotating sensor and signal demodulation system comprising:

a sensor coupled to rotate with an assembly through an angle of 360° for each rotation of the assembly;

means for providing an output signal representing a parameter detected by said sensor during each rotation of said assembly;

means for providing a frequency modulated signal in response to said output signal;

means for providing a timing signal for each 360° rotation of said assembly;

means for detecting each cycle of said frequency modulated signal;

means responsive to said timing signal for calculating the angular position of said sensor;

means responsive to each detected cycle of said frequency modulated signal and to the angular position of said sensor for determining the sine of the angle representing said angular position of said sensor and providing a digital output of that sine;

means responsive to each detected cycle for cumulatively summing the determined sines over a period of one rotation of said sensor; and means for providing as a demodulated output signal, the summed sines, said demodulated output signal being a digital representation of the detected parameter.

12. The system of claim 11 wherein said means for providing an output signal comprises a means for providing a sinusoidal voltage during each rotation of said sensor and wherein said means for providing a frequency modulated signal provides a signal representative of the phase and amplitude of said sinusoidal voltage.

13. The system of claim 12 wherein said sensor is coupled to sense acceleration.

14. The system of claim 12 wherein said sensor and rotating assembly comprise an aircraft multisensor assembly constructed and arranged to sense rate.

15. The system of claim 12 wherein said frequency modulated signal is a frequency modulated sinusoidal signal.

16. The system of claim 12 wherein said means for determining the sine comprises a programmed read only memory having a table of digital values representing a predetermined number of sine values over sensor angles of 0° to 360°.

17. The system of claim 16 wherein said means for determining the sine of the sensor angle includes a digital counter which provides a digital address representing a predetermined angular position of said sensor, said address being coupled to said programmed read only memory to select the particular sine for that addressed angle.

18. The system of claim 11 wherein said means for summing is a digital summing circuit coupled to a digital accumulator circuit for summing each successive angular sine in response to each detected cycle of the frequency modulated signal over an interval of one sensor rotation and storing that sum until the completion of the next successive rotation of said sensor.

* * * * *